United States Patent
Cho et al.

(10) Patent No.: US 9,898,051 B2
(45) Date of Patent: Feb. 20, 2018

(54) HINGE DEVICE

(71) Applicant: Seneka Co., Ltd., Suwon-si (KR)

(72) Inventors: Pil Je Cho, Suwon-si (KR); Young Woo Huh, Suwon-si (KR)

(73) Assignee: Seneka Co., Ltd., Suwon-si (KR)

( * ) Notice: Subject to any disclaimer, the term of this patent is extended or adjusted under 35 U.S.C. 154(b) by 0 days.

(21) Appl. No.: 15/519,016

(22) PCT Filed: Oct. 16, 2015

(86) PCT No.: PCT/KR2015/010980
§ 371 (c)(1),
(2) Date: Apr. 13, 2017

(87) PCT Pub. No.: WO2016/060519
PCT Pub. Date: Apr. 21, 2016

(65) Prior Publication Data
US 2017/0235343 A1   Aug. 17, 2017

(30) Foreign Application Priority Data
Oct. 17, 2014   (KR) .................. 10-2014-0141218

(51) Int. Cl.
*G06F 1/16* (2006.01)
(52) U.S. Cl.
CPC .......... *G06F 1/1681* (2013.01); *G06F 1/1616* (2013.01); *G06F 1/1652* (2013.01)
(58) Field of Classification Search
CPC .............................. G06F 1/1652; G06F 1/1681
See application file for complete search history.

(56) References Cited

U.S. PATENT DOCUMENTS

| 8,804,324 | B2* | 8/2014 | Bohn | G06F 1/1616 |
| | | | | 345/1.1 |
| 8,813,312 | B2* | 8/2014 | Song | G06F 1/1601 |
| | | | | 16/225 |
| 9,348,362 | B2* | 5/2016 | Ko | G06F 1/1626 |
| 9,625,953 | B2* | 4/2017 | Bitz | G06F 1/1681 |
| 2007/0117600 | A1* | 5/2007 | Robertson, Jr. | H04M 1/0216 |
| | | | | 455/575.3 |
| 2014/0126133 | A1* | 5/2014 | Griffin | G06F 1/1616 |
| | | | | 361/679.27 |
| 2014/0196254 | A1* | 7/2014 | Song | E05D 3/14 |
| | | | | 16/302 |
| 2015/0077917 | A1* | 3/2015 | Song | G06F 1/1652 |
| | | | | 361/679.27 |

(Continued)

FOREIGN PATENT DOCUMENTS

KR   10-2010-0079459 A   7/2010
KR   10-2012-0122600 A   11/2012
(Continued)

OTHER PUBLICATIONS

International Search Report dated Jan. 28, 2016, in counterpart International Application No. PCT/KR2015/010980 (2 pages in English, 2 pages in Korean).

*Primary Examiner* — Nidhi Thaker
(74) *Attorney, Agent, or Firm* — NSIP Law (57) ABSTRACT

According to the hinge device of the present invention, a hinge part connecting a first body part and a second body part forming a multimedia apparatus for the hinge device is provided, where the hinge part includes a plurally-arranged hinge blocks.

13 Claims, 8 Drawing Sheets

(56) References Cited

U.S. PATENT DOCUMENTS

2015/0378391 A1* 12/2015 Huitema ................ G06F 1/163
                                                    361/679.03
2016/0187935 A1*  6/2016 Tazbaz ................. G06F 1/1681
                                                    361/679.03

FOREIGN PATENT DOCUMENTS

| KR | 10-2013-0073331 A |   | 7/2013 |            |
|----|-------------------|---|--------|------------|
| KR |   20130073331 A   | * | 7/2013 | G06F 1/1652 |
| KR | 10-2014-0049911 A |   | 4/2014 |            |
| KR | 10-2014-0101274 A |   | 8/2014 |            |

* cited by examiner

HINGE DEVICE

CROSS-REFERENCE TO RELATED APPLICATIONS

This application is a U.S. national stage application of International Application No. PCT/KR2015/010980, filed on Oct. 16, 2015, which claims the benefit under 35 USC 119(a) and 365(b) of Korean Patent Application No. 10-2014-0141218, filed on Oct. 17, 2014, in the Korean Intellectual Property Office.

TECHNICAL FIELD

The present invention relates to a hinge device used for multimedia apparatus including notebooks or mobile phones.

BACKGROUND ART

Multimedia apparatus including notebooks or mobile phones are generally configured in a folder type. The general notebook is formed in an openable/closeable folder type including a first body part mounted with a main board and a keyboard, and a second body part mounted with a display screen. A hinge device is installed at a rotation center between the first body part and the second body part.

Meantime, unlike the conventional display, a recently spot-lighted flexible display suffers from a disadvantage when the display is formed with an area covering both the first body part and the second body part.

For example, the flexible display may be disadvantageously folded excessively at a border between the first body part and the second body part mounted with the hinge device beyond a bending1 deformation limit bearable by the flexible display, and the flexible display may be damaged by receiving a compressive force or a tension because the hinge device may be changed in length when rotating.

The Korean Registered Patent No.:10-1103210 simply discloses a type of flexible display encompassing a mobile terminal, but fails to mention a coupled structure between a hinge device and the flexible display.

DISCLOSURE OF INVENTION

Technical Subject

The present invention is disclosed to solve the disadvantages/problems, and to provide a hinge device configured to minimize a bending deformation of flexible display and to prevent the flexible display from being generated with changes in length when the hinge device is rotated, even if the hinge device is rotated as much as at a same angle when the flexible display is folded about a rotating center of the hinge device.

Technical problems to be solved by the present invention are not restricted to the above-mentioned, and any other technical problems not mentioned so far will be clearly appreciated from the following description by skill in the art.

Technical Solution

An object of the present invention is to solve at least one or more of the above problems and/or disadvantages in whole or in part and to provide at least the advantages described hereinafter.

In order to achieve at least the above objects, in whole or in part, and in accordance with the purposes of the present invention, as embodied and broadly described, and in one general aspect of the present invention, there is provided a hinge device, the device comprising:

a hinge part connecting a first body part and a second body part forming a multimedia apparatus, wherein the hinge part includes plurally-arranged hinge blocks, and wherein, when an imaginary rotating center line generating no change in length during rotation of the hinge part and maintaining a predetermined length is defined as a neutral line, and a surface of the first body part and the second body part mounted with a flexible display is defined as a first surface, each hinge block is relatively rotated to allow the neutral line to be positioned on the first surface mounted with the flexible display.

Preferably, but not necessarily, at least a part of the flexible display may directly contact an outside-exposed surface of the hinge block, and the hinge block may be lengthily extended to allow a width of the hinge block to be more than a width of the flexible display.

Preferably, but not necessarily, the hinge device may further comprise a cover part interposed between the flexible display and the hinge part, wherein the flexible display is tightly contacted to the cover part.

Preferably, but not necessarily, a cover part accommodated by the flexible display may be provided separately from the hinge part, and the cover part may include plurally-arranged cover blocks.

Preferably, but not necessarily, a width of the cover part and a width of the cover block may be more than a width of the flexible display.

Preferably, but not necessarily, a cover part facing an entire area necessary for bending deformation of the flexible display may be provided between the flexible display and the hinge block.

Preferably, but not necessarily, the hinge device may comprise a cover part accommodated by the flexible display, wherein the cover includes plurally-arranged cover blocks, and wherein a rotation angle θ1 is generated at a boundary point of each hinge block, and a rotation angle θ2 is generated at boundary point of each cover block, when the first body part or the second body part is rotated, and wherein the θ2 is smaller than θ1.

Preferably, but not necessarily, the hinge device may comprise: a cover part accommodated by the flexible display, wherein both distal ends of the hinge part are fixed to the first body part or the second body part as a hinge fixture, and both distal ends of cover part are fixed to the first body part or the second body part as a cover part fixture, and wherein the hinge part and the cover part have a same fixing point or a reference point, and wherein the cover part is also interacted when the hinge part is rotated due to position relationship of the mutually contacted hinge part and the cover part, and wherein the flexible display is bent at an angle same as an entire rotation angle of the hinge part.

Preferably, but not necessarily, the cover part accommodated by the flexible display may include a plurality of cover blocks, and a discontinuous bending angle of the flexible display may match a bending angle generated from a boundary point of the cover block, and may be smaller than a bending angle generated from a boundary point of the hinge block.

Preferably, but not necessarily, the cover part accommodated by the flexible display may include a plurality of cover blocks, and the number of cover blocks may be greater than the number of the hinge blocks.

Preferably, but not necessarily, the cover part accommodated by the flexible display may include a plurality of cover blocks, and one hinge block may face a plurality of cover blocks, and both distal ends of the hinge block may be so aligned as to match to both distal ends of the plurality of cover blocks.

Preferably, but not necessarily, the mutually connected each hinge block may be shrunken or elongated in a discrete distance of each hinge block based on a rotation center line of the hinge block.

Preferably, but not necessarily, each hinge block may be connected to a link plate, and the link plate may be formed with a long hole.

Preferably, but not necessarily, a cover part accommodated by the flexible display may be provided separately from the hinge part, and the cover part may include plurally-arranged cover blocks, and the flexible display may be bent while a corner of the first body part, a corner of the second body part and a corner of each cover block are all contacted.

Preferably, but not necessarily, a cover part accommodated by the flexible display may be provided separately from the hinge part, and the cover part may include plurally-arranged cover blocks, and the flexible display may be bent, using a corner of the first body part, at a corner of the second body part and at a corner of each cover block as an imaginary rotation center axis.

Advantageous Effect of Invention

The present invention has an advantageous effect in that a hinge part is shrunken or elongated during rotation, and a neutral line disposed at a first surface, which is one side surface of the hinge part, is mounted on a flexible display, such that a flexible display is prevented from being shrunken or elongated because of no receipt of compressive force or tension, and only bent to a straight bent line or a curved line to thereby satisfy a flexibility limit of the flexible display.

Another advantageous effect is that, when a cover part functioning as a kind of dummy hinge part is provided, the hinge part is accommodated into the cover part, and thereby, the hinge part is unseen when viewed from outside to expose only a beautiful external cover part without a seam (joint), and to obtain a seamless function of hinge device. The seamless function is accomplished by the cover part, a width length of the hinge part can be freely designed, and a rotation resistance in response to increase/decrease of width length can be also easily overcome. Furthermore, when a width of the hinge part is extended as much as a width of the flexible display, a feared weight or cost increase can be restricted.

The cover part can apply a bending deformation (deflection) to the flexible display in response to rotation of the hinge part, while the flexible display is made to be independent from the hinge part.

The hinge part and the cover part have a same fixed point or a reference point, and due to mutually closely contacted position relationship, the cover part is also interacted when the hinge part is rotated, and the flexible display is bent at a same angle as that of an entire rotation angle of the hinge part.

The number of cover blocks is increased while a dimensional width of hinge block remains unchanged, whereby a bending angle at a boundary point of the cover block is divided at an angle smaller than a bending angle generated at a boundary point of hinge block, and an discontinuous bending angle of flexible display is also further finely (minisculely) divided as many as an installation number of cover blocks.

Thus, the number of hinge blocks having a complex mechanical structure for obtaining a load support or a rotation resistance can be minimally reduced but the size can be maximally increased, to thereby accomplish an assembleability enhancement and defect restriction, and to reduce a mechanical characteristic error between each hinge block. At the same time, a gap between each cover block is made to be dense to improve closeness degree of flexible display, to induce a beautiful/elegant curved deformation and to restrict generation of cracks.

BEST MODE

Hereinafter, the present invention according to exemplary embodiments of the present invention will be described in detail with reference to the accompanying drawings. However, the present invention is not limited to the embodiments and may be realized in various other forms such as additions, variations, modifications. Detailed descriptions of well-known functions, configurations or constructions are omitted for brevity and clarity so as not to obscure the description of the present disclosure with unnecessary detail.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Before explaining the characteristics of the present invention, an exemplary embodiment of imaginary line will be explained first.

Figure 1:
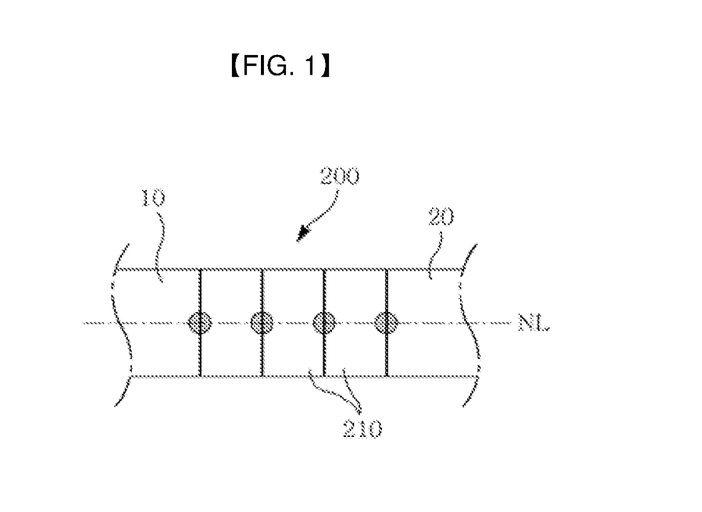
FIG. 1 is an explanation drawing illustrating a multimedia apparatus being unfolded when a neutral line is in the center of the multimedia apparatus, as an imaginary exemplary embodiment for comparison with the present invention.
Figure 2:
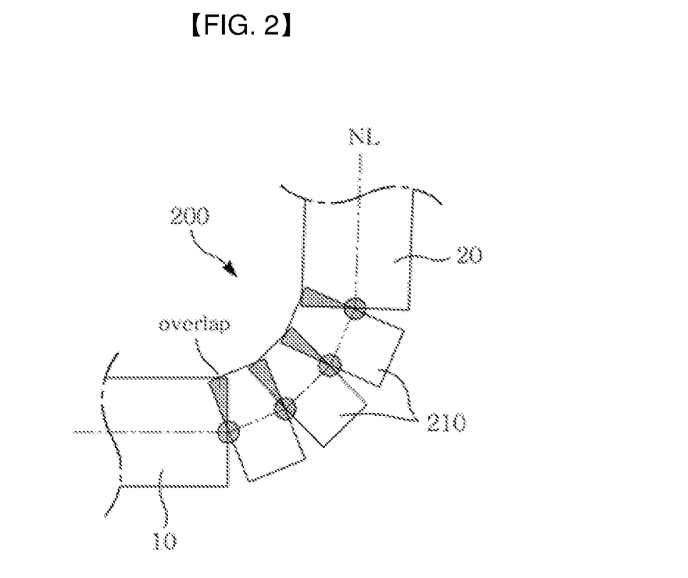
FIG. 2 is an explanation drawing illustrating a multimedia apparatus being folded when a neutral line is in the center of the multimedia apparatus, as an imaginary exemplary embodiment for comparison with the present invention.

FIG. 1 is a drawing illustrating an exemplary embodiment of imaginary line in order to compare with the present invention, where a multimedia apparatus is unfolded when a neutral line is in the center of the multimedia apparatus, and FIG. 2 is a drawing illustrating an exemplary embodiment of imaginary line in order to compare with the present invention, where a multimedia apparatus is folded when a neutral line is in the center of the multimedia apparatus.

An 'NL (Neutral Line)' in the present invention is an imaginary center rotation line that does not generate changes in length when a hinge device or a hinge part (200) is rotated and maintains a predetermined length. In explaining a position where the NL can exist, an NL may exist on a first surface of a body part, or may exist on a second surface which is a rear surface of the first surface of the body part, or may exist at a center of the body part, or may exist at an arbitrary center area between the first and second surface.

FIGS. 1 and 2, which are imaginary exemplary embodiments compared to the present invention, illustrate a case, where an NL exists at a center of the body part, or exists at an arbitrary center area between the first and second surface. When the NL exists at a center of the body part, as illustrated in drawings, only the length of NL is maintained at a predetermined level when the body part is relatively rotated. However, because a relevant trace of the first surface corresponding to an upper surface of the body part decreases, and when a flexible display (30) is attached to a first surface, the flexible display (30) may not only receive a bending damage due to shearing force, but also may be broken along with a bending deformation by receiving a compressive force, or may be damaged at an attached state with the first surface.

Figure 3:
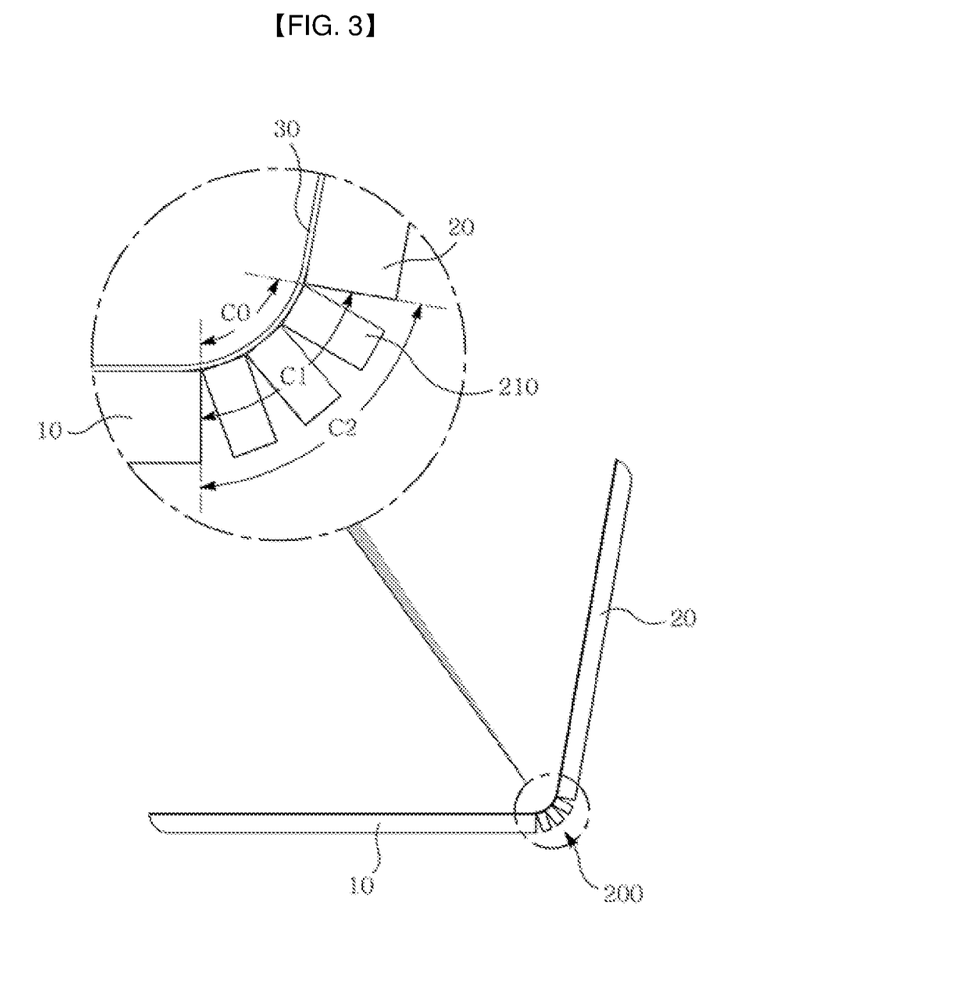
FIG. 3 is a lateral view of a hinge device in which a neutral line is lopsidedly arranged at a position adjacent to a multimedia apparatus and a multimedia apparatus having the hinge device according to a first exemplary embodiment of the present invention.

The hinge part (200) may be configured in such a manner that the hinge part is sequentially arranged with a plurality of hinge blocks (210), and each hinge block (210) is relatively rotated. When each of the hinge blocks (210) is so configured as to leave no empty gap therebetween in an unfolded state as illustrated in FIG. 1, the multimedia apparatus is folded, and a gap (opening) between each hinge block (210) is overlapped on the first surface, as illustrated in FIG. 2, to generate an interference, whereby disadvantages may be generated where rotation cannot be made, and a gap between each hinge block (210) is excessively widened on the second surface. In order to improve the disadvantages, a first exemplary embodiment of the present invention is derived as below:

FIG. 3, as a first exemplary embodiment of the present invention, illustrates that an NL is lopsidedly arranged at a position adjacent to the flexible display (30).

In the first exemplary embodiment of the present invention, an NL is lopsidedly arranged at a position adjacent to a surface mounted with the flexible display (30). That is, a first surface mounted with the flexible display (30) is disposed with the NL, or a position mounted with the flexible display (30) matches a position of the NL.

The hinge part (200) may include a plurally-arranged hinge blocks (210). In the first exemplary embodiment, at least a part of the flexible display (30) may directly face a surface of the hinge block (210). That is, the flexible display (30) may directly contact an outside exposed surface of the hinge block forming the hinge part (200).

Even if the multimedia apparatus is folded, a length (C0) of the NL is unchanged, and the NL may be simply a curved (bent) straight line or a curved line by being formed with a bent deformation (deflection). As a result, the flexible display (30) mounted at the NL is not shrunken or elongated by compressive force of tension, but merely bent as a curved straight line or a curved line to thereby satisfy the flexibility limit of flexible display.

A rotation center line of hinge part (200) may be defined as a line connecting each center of hinge blocks (210) forming the hinge part (200). The rotation center line of hinge part (200) may be indicated as reference numeral C1 on the FIG. 3.

Although the length (C0) of NL before and after rotation of the hinge part (200) may be unchanged in the first exemplary embodiment, a length of the rotation center line (C1) may be increased in proportion to increase of rotation angle. Therefore, the hinge part (200) may be configured to allow a distance between a center of hinge block (210) to increase as the rotation angle of the hinge part (200) increases. The hinge part (200) configured to allow a distance between a center of hinge block (210) to shrink or elongate in response to the increase/decrease of the rotation angle is exemplified in FIG. 10.

The flexible display (30) in the first exemplary embodiment may be so installed as to be tightly contacted to the hinge part (200) or as to be in a fixed state to a surface of the hinge part (200). At this time, means applying a shearing force necessary for supporting a load of the flexible display (30) or bending (flexing) the flexible display (30) may be the hinge part (200) or the hinge block (210).

However, when a width (Lh in FIG. 4) of hinge part (200) is designed to be smaller than a width (Lm in FIG. 4) of flexible display (30) in the course of implementing the first exemplary embodiment, at least a part of the flexible display (30) cannot tightly contact the hinge part (200) to fearfully fail to obtain a uniformity of bending deformation at the flexible display (30).

Figure 4:
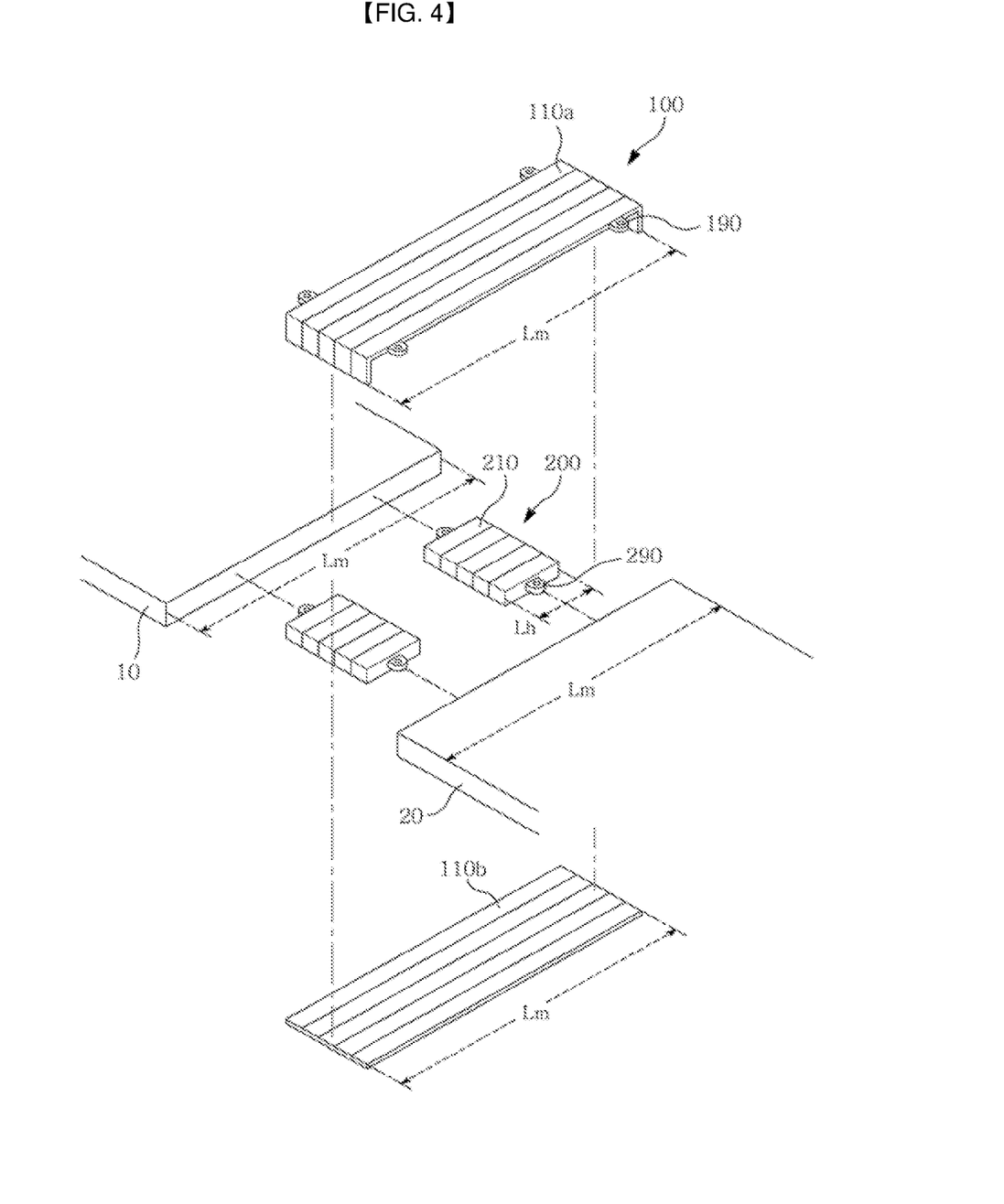
FIG. 4 is an exploded perspective view illustrating a hinge device attached with a flexible display at a cover part and a multimedia apparatus having the same according to a second exemplary embodiment of the present invention.

Albeit not illustrated in the first exemplary embodiment, and in order to improve this disadvantage, it is preferable that the hinge part (200) or the hinge block (210) be extended to allow a width of the hinge part (200) or hinge block (210) (corresponding to Lh of FIG. 4) to have a length sufficient enough to be more than a width of the flexible display (corresponding to Lm of FIG. 4). Furthermore, a second exemplary embodiment illustrated in FIG. 4 along with the improved first exemplary embodiment lengthening the length of the hinge part (200) is proposed hereunder.

Figure 5:
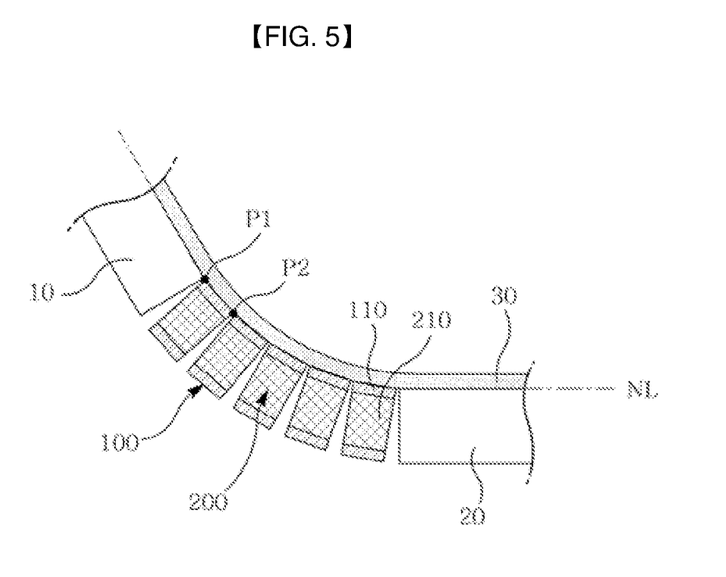
FIG. 5 is a schematic lateral view illustrating a hinge device in a folded state according to a second exemplary embodiment of the present invention.

FIG. 4 is an exploded perspective view illustrating a hinge device attached with a flexible display (30) at a cover part (100) and a multimedia apparatus having the same according to a second exemplary embodiment of the present invention, and FIG. 5 is a schematic lateral view illustrating a hinge device in a folded state according to a second exemplary embodiment of the present invention.

The hinge device according to the second exemplary embodiment of the present invention may sequentially include a flexible display (30), a cover part (100) and a hinge part (200). The cover part (100) accommodated by the flexible display (30) may be separately disposed on the hinge part (200) in the second exemplary embodiment. Thus, the hinge part (200) may share a function of connecting two body parts, and the cover part (100) may share the accommodating function of the flexible display (30), where the hinge part (200) and the cover part (100) may interact together.

A cover part (100) interposed between the flexible display (30) and the hinge part (200) may be provided in the second exemplary embodiment. The cover part (100) may take a shape of a plurality of cover blocks (110) being arranged in a row. A width of the hinge block (210) and a width of the cover block (110) may be matched in the second exemplary embodiment.

The cover part (100) may be tightly contacted to the flexible display (30), support a load of the flexible display (30), or apply a shearing force to the flexible display (30) necessary for bending deflection (deformation). A width (Lm) of the cover part (100) may be extended more than the width (Lm) of the flexible display (30). Thus, the cover part (100) can face an entire area necessary for the bending deformation of the flexible display (30). Meantime, the hinge part (200)

Meantime, the hinge part (200) may be disposed at a rear surface of the cover part (100) without directly facing the flexible display (30). The hinge part (200) and the cover part (100) may be interacted because of the position relationship between the hinge part (200) and the cover part (100). The hinge part (200) may connect the first body part (10) and the second body part (20) to generate a rotation resistance of more than a predetermined value, to maintain a folding angle between the first body part (10) and the second body part (20), and to prevent the second body part (20) from falling relative to the first body part (10). This is to enable a relative rotation between the first body part (10) and the second body part (20) to be implemented by applying an external force of more than a predetermined level by hand.

When a cover part (100) functioning as a kind of dummy hinge part (200) is provided, the hinge part (200) may be accommodated inside the cover part (100), and when viewed from outside, the hinge part (200) is not exposed and instead only the cover part (100) having a beautiful external look is exposed without any seam to obtain a seamless function of the hinge device. Because the seamless function is accomplished by the cover part (100), a length of width of the hinge part (200) may be freely designed, and changes in rotation resistance in response to increase/decrease of length of width can be easily coped with. Furthermore, a fear of weight increase or cost increase generated when a width of the hinge part (200) is extended as much as a width of the flexible display (30) can be restricted.

Figure 10:
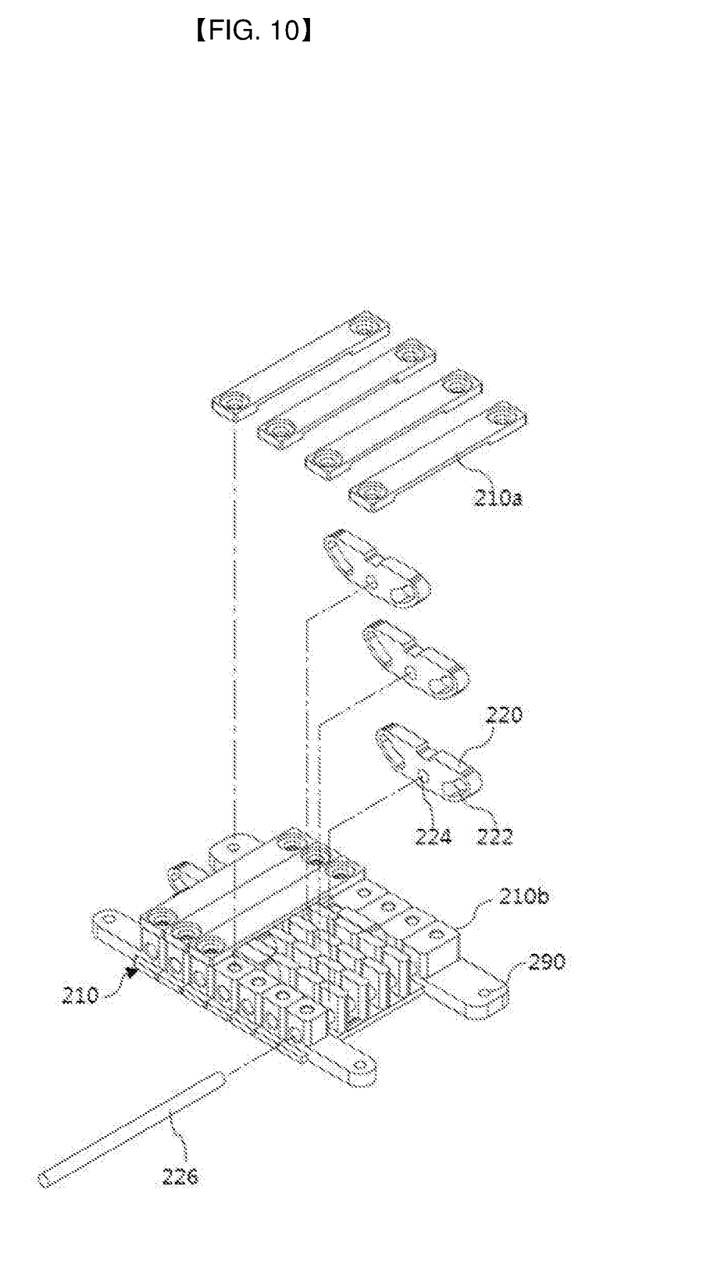
FIG. 10 is an exploded prospective view illustrating a hinge part according to the present invention.

As illustrated in FIG. 10, the hinge part (200) takes a complex mechanical structure, and may be provided in a metal material in order to elastically secure a load support or a rotation resistance, but the cover part (100) may be sufficient with a light-weighted synthetic resin because it is simply for seamless function.

Both distal ends of hinge part (200) may be fixed to the first body part (10) or to the second body part (20) using a hinge part fixture (290), and distal ends of cover part (100) may be fixed to the first body part (10) or to the second body part (20) using a cover part fixture (190). Thus, the hinge part (200) and the cover part (100) have a same fixed point or a reference point, and the cover part (100) is interacted together when the hinge part (200) is rotated due to mutually and tightly contacted position relationship, and bends the flexible display (30) at an angle same as an entire rotation angle of hinge part (200).

Meanwhile, if an insufficient aspect of the second exemplary embodiment is ever to be sought out, discontinuous bent angle may be generated at reference numerals P1 and P2 of FIG. 5 corresponding to each boundary point of hinge block (210) or to each boundary point of cover block (110). Thus, as illustrated in FIG. 6, a rotation angle θ1 results in generating a discontinuous bent angle to the flexible display (30) at a boundary point of each hinge block (210).

Figure 6:
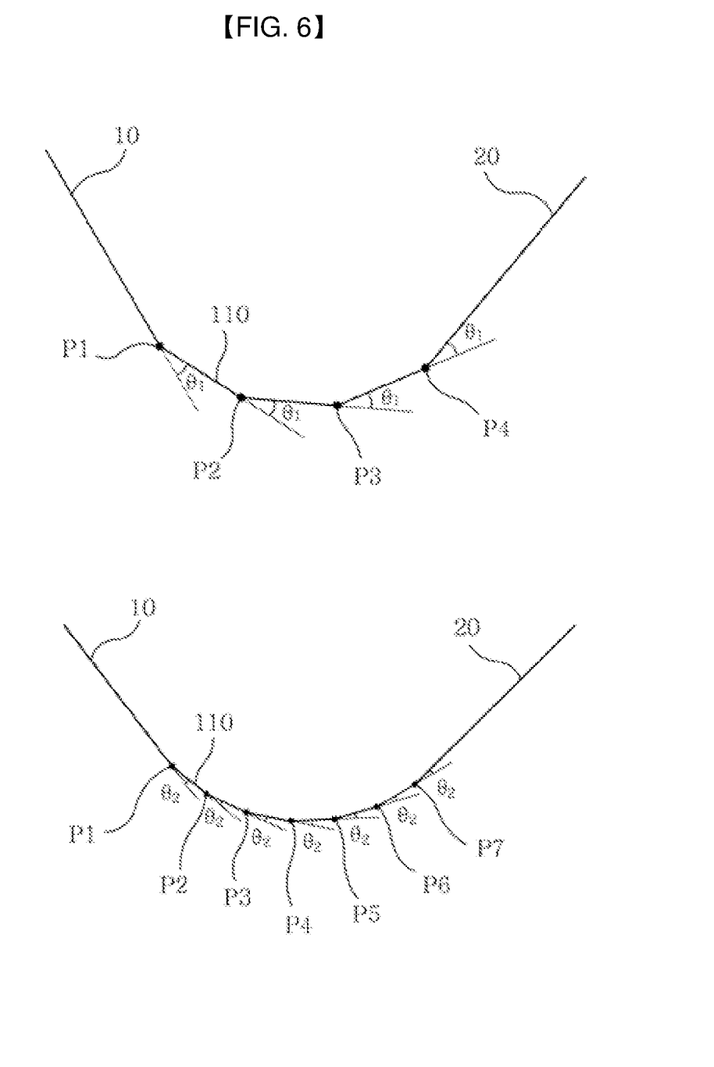
FIG. 6 is an explanation drawing explaining a hinge device according to a third exemplary embodiment of the present invention.
Figure 7:
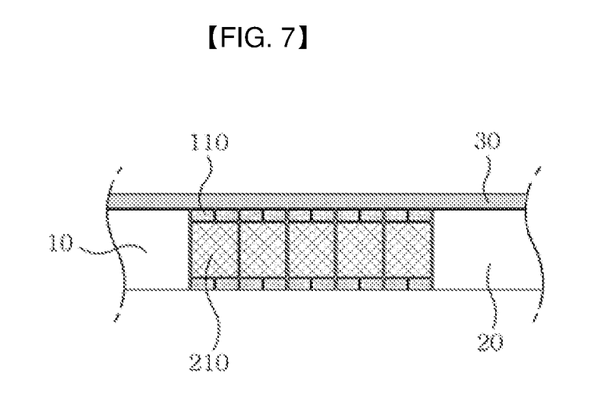
FIG. 7 is a schematic view illustrating a hinge device in a unfolded state according to a third exemplary embodiment and a lateral cross-sectional view having the same.
Figure 8:
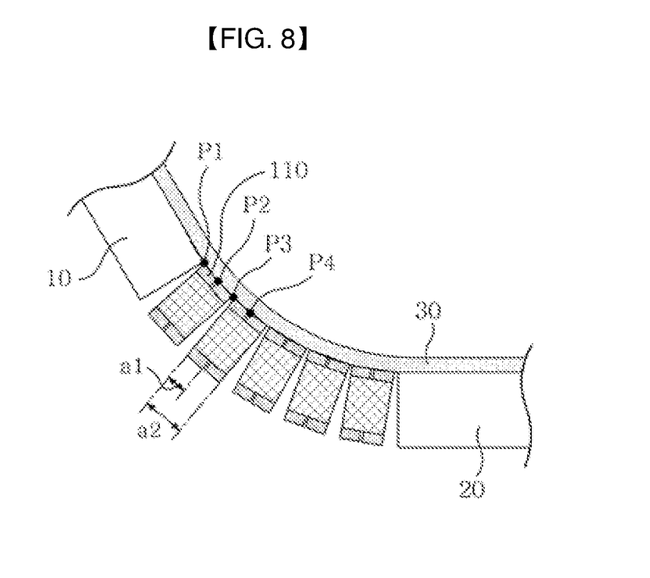
FIG. 8 is a schematic view illustrating a hinge device in a folded state according to a third exemplary embodiment and a lateral cross-sectional view of a multimedia apparatus having the same.
Figure 9:
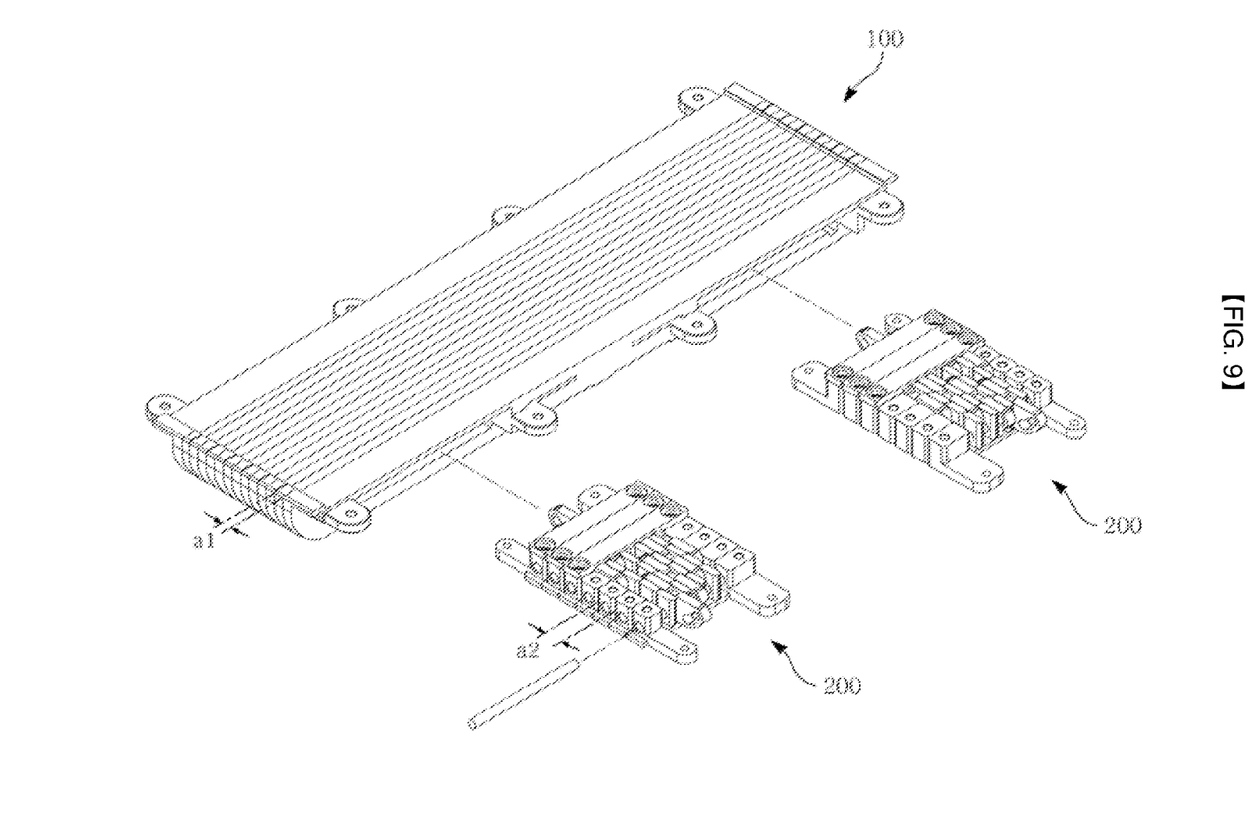
FIG. 9 is an exploded prospective view illustrating a hinge part and a cover part according to a third exemplary embodiment of the present invention.

FIG. 6 is an explanation drawing explaining a hinge device according to a third exemplary embodiment of the present invention, FIG. 7 is a schematic view illustrating a hinge device in a unfolded state according to a third exemplary embodiment and a lateral cross-sectional view having the same, FIG. 8 is a schematic view illustrating a hinge device in a folded state according to a third exemplary embodiment and a lateral cross-sectional view of a multi-media apparatus having the same, and FIG. 9 is an exploded prospective view illustrating a hinge part (200) and a cover part (100) according to a third exemplary embodiment of the present invention.

First, referring to FIG. 6, a case where a rotation angle of reference numeral θ1 is generated at each hinge block (210) or each cover block (110), as illustrated at an upper end, is the first or the second exemplary embodiment.

The third exemplary embodiment illustrated at a lower end of FIG. 6 can increase the number of cover blocks (110) while leaving a dimensional width of the hinge block (210) to be unchanged. The reason of this being enabled is that a cover part (100) is interposed between the hinge part (200) and the flexible display (30) to disallow the discontinuous point generated from a boundary point of each hinge block (210) and the discontinuous point generated from a boundary point of each cover block (110) to match.

Applying a bending deformation to the flexible display (30) is not the hinge part (200), but the cover part (100). The hinge part (200) may function to connect the first body part (10) and the second body part (20). The cover part (100) may apply a bending deformation to the flexible display (30) in response to the rotation of the hinge part (200) while the flexible display (30) is in an independent state from the hinge part (200).

Although the boundary point of the hinge block (210) is generated with a bending angle of reference numeral θ1, the boundary point of cover block (110) may be generated with a bending angle of reference numeral θ2 which is smaller than the reference numeral θ1. Thus, the bending angle at the boundary point of the cover block (110) may be divided at a more smaller angle than the bending angle generated from the boundary point of the hinge block (210) as the number of cover blocks (110) increases, and the discontinuous bending angle of the flexible display (30) may be also divided at a more minuscule angle as many as the installation number of cover blocks (110).

Because the cover block (110) must be made with a thin thickness, a first cover block (110) and a second cover block (110) that encompass the hinge part (200) can be included. The hinge part (200) may be accommodated on at least a part of space between the first cover block (110) and the second cover block (110).

The discontinuous bending angle of the flexible display (30) matching to the bending angle generated from the boundary point of the cover block (110) may be smaller than a bending angle generated from a boundary point of the hinge block (210). Thus, generation of cracks from the flexible display (30) can be restricted, and an entire bending angle of the flexible display (30) can be divided in a more minuscule manner to thereby secure a long life and to allow being bent more closely to the curved surface.

Now, reference is made to FIG. 7 of unfolded state and FIG. 8 of folded state. A width (a1) of the cover block (110)

may be smaller than a width (a2) of the hinge block (210). In an exemplary embodiment, the hinge part (200) may include a plurally-arranged hinge blocks (210), the cover block (100) may include a plurally-arranged cover blocks (110), and the number of the cover blocks (110) may be an integer multiple of the number of hinge blocks (210). At this time, a single hinge block (210) may face the plurality of cover blocks (110), and both distal ends of hinge block (210) may be so aligned as to match with the distal ends of the plurality of cover blocks (110).

Unlimited to the given illustrations, an exemplary embodiment may be also possible where the integer multiple relationship between the number of the cover blocks (110) and the number of the hinge blocks (210) is not formed.

In an exemplary embodiment, the cover blocks (110) may be divided with more number than the number of the hinge blocks to allow the bending angle between each cover block (110) to be smaller than the bending angle between each hinge block (210). The purpose of the present invention is to allow the discontinuous point of bending deformation at the flexible display (30) to be increased to be closer to a curved surface, such that an exemplary embodiment of no integer multiple relationship is possible as long as the rotational movement of hinge part (200) does not interfere with the rotational movement of the cover part (100).

Although the flexible display (30) may be bent to closer to the curved surface, as the number of cover blocks (110) forming the cover part (100) is increased, the number of hinge blocks (210) may be reduced to a minimum. Thus, the number of hinge blocks (210) having a complex mechanical structure for securing a load support or rotation resistance can be reduced while the size can be maximally increased, whereby assembleability can be enhanced, restriction of defective products can be accomplished, and a mechanical characteristic error between each hinge block (210) can be reduced. At the same time, a gap between each cover block (110) is made to be dense to improve closeness degree of flexible display (30), to induce a beautiful/elegant curved deformation and to restrict generation of cracks.

FIG. 10 is an exploded prospective view illustrating a hinge part (200) according to the present invention. The illustrated hinge part (200) may be used for the first, second or third exemplary embodiment, and may take a link structure where a length is shrunk or elongated during rotation movement.

Toward this end, the hinge part (200) may be formed with a hinge block (210) which becomes each rotation unit, where each hinge block (210) may be connected to a link plate (220). At least one link plate may be installed. The hinge block (210) and the link plate (220) may be connected via a connection axle (226). The link plate (220) may be disposed with an long hole (222) at an area connected by the hinge block (210) and the connection axle (226) based on a rotation center line of hinge block (210) in order to allow a length of the hinge part (200) to be shrunken or elongated. A discrete distance of each hinge block (210) connected by the long hole (222) may be shrunken or elongated based on the rotation center line of the hinge block (210). A round hole (224) may be provided in order to adjust a reference position of the link plate (220) relative to the hinge block (210), and both the round hole (224) and the long hole (222) may be provided on one link plate (220).

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

| [Description of Reference Numerals | |
|---|---|
| 10 first body part | 20 second body part |
| 30 flexible display | 100 cover part |
| 110 cover block | 110a first cover plate |
| 110b second cover plate | 190 cover part fixture |
| 200 hinge part | 210 hinge block |
| 210a first hinge plate | 210b second hinge plate |
| 220 link plate | 222 long hole |
| 224 round hole | 226 connection axle |
| 290 hinge part fixture | |

The invention claimed is:

1. A hinge device, the device comprising: a hinge part connecting a first body part and a second body part forming a multimedia apparatus, wherein the hinge part includes plurally-arranged hinge blocks, and wherein, when an imaginary rotating center line generating no change in length during rotation of the hinge part and maintaining a predetermined length is defined as a neutral line, and a surface of the first body part and the second body part mounted with a flexible display is defined as a first surface, each hinge block is relatively rotated to allow the neutral line to be positioned on the first surface mounted with the flexible display, wherein a cover part facing an entire area necessary for bending deformation of the flexible display is provided between the flexible display and the hinge block, wherein the cover part includes plurally-arranged cover blocks, and wherein a rotation angle θ1 is generated at a boundary point of each hinge block, and a rotation angle θ2 is generated at a boundary point of each cover block, when the first body part or the second body part is rotated, and wherein the θ2 is smaller than θ1.

2. The hinge device of claim 1, wherein at least a part of the flexible display directly contacts an outside-exposed surface of the hinge block, and the hinge block is lengthily extended to allow a width of the hinge block to be more than a width of the flexible display.

3. The hinge device of claim 1, wherein the flexible display is tightly contacted to the cover part.

4. The hinge device of claim 1, wherein the cover part is provided separately from the hinge part.

5. The hinge device of claim 4, wherein a width of the cover part and a width of the cover block are more than a width of the flexible display.

6. The hinge device of claim 1, wherein both distal ends of the hinge part are fixed to the first body part or the second body part as a hinge fixture, and both distal ends of the cover part are fixed to the first body part or the second body part as a cover part fixture, and wherein the hinge part and the cover part have a same fixing point or a reference point, and wherein the cover part is also interacted when the hinge part is rotated due to a position relationship of the mutually contacted hinge part and the cover part, and wherein the flexible display is bent at an angle same as an entire rotation angle of the hinge part.

7. The hinge device of claim 1, wherein a discontinuous bending angle of the flexible display matches a bending angle generated from a boundary point of the cover block, and is smaller than a bending angle generated from a boundary point of the hinge block.

8. The hinge device of claim 1, wherein the number of cover blocks is greater than the number of the hinge blocks.

9. The hinge device of claim 1, wherein one hinge block faces a plurality of cover blocks, and both distal ends of the hinge block are so aligned as to match to both distal ends of the plurality of cover blocks.

10. The hinge device of claim 1, wherein the mutually connected each hinge block is shrunken or elongated in a discrete distance of each hinge block based on a rotation center line of the hinge block.

11. The hinge device of claim 1, wherein each hinge block may be connected to a link plate, and the link plate may be formed with a long hole.

12. The hinge device of claim 1, wherein the flexible display is bent while a corner of the first body part, a corner of the second body part and a corner of each cover block are all contacted.

13. The hinge device of claim 1, wherein the flexible display is bent, using a corner of the first body part, at a corner of the second body part and at a corner of each cover block as an imaginary rotation center axis.

\* \* \* \* \*